United States Patent
Genest et al.

(10) Patent No.: US 6,480,377 B2
(45) Date of Patent: Nov. 12, 2002

(54) PROTECTIVE CASE WITH A KEYBOARD FOR A HANDHELD COMPUTER

(75) Inventors: Leonard J. Genest, Santa Ana, CA (US); Manuchehr Rahimzadeh, El Toro, CA (US); Michael Jeng, Taipei (TW); Kent Lu, Taipei (TW)

(73) Assignee: Fellowes Manufacturing Company, Itasca, IL (US)

( * ) Notice: Subject to any disclaimer, the term of this patent is extended or adjusted under 35 U.S.C. 154(b) by 120 days.

(21) Appl. No.: 09/753,711

(22) Filed: Jan. 4, 2001

(65) Prior Publication Data
US 2002/0101705 A1 Aug. 1, 2002

(51) Int. Cl.⁷ .............................. G06F 1/16; H05K 5/02
(52) U.S. Cl. ....................... 361/686; 361/683; 345/169; 710/303
(58) Field of Search ................................. 361/686, 680, 361/681, 683; 345/168, 169, 905; 400/489, 693; 710/303, 304; 235/145 R, 145 A, 146

(56) References Cited

U.S. PATENT DOCUMENTS

| | | | |
|---|---|---|---|
| 5,128,829 A | | 7/1992 | Loew |
| 5,278,779 A | * | 1/1994 | Conway et al. .......... 364/708.1 |
| D351,613 S | | 10/1994 | Sakaguchi et al. |
| 5,548,477 A | | 8/1996 | Kumar et al. |
| 5,638,257 A | | 6/1997 | Kumar et al. |
| 5,708,560 A | | 1/1998 | Kumar et al. |
| 5,712,760 A | | 1/1998 | Coulon et al. |
| 5,745,056 A | | 4/1998 | Takahashi et al. |
| 5,941,648 A | | 8/1999 | Robinson et al. |
| 5,996,956 A | | 12/1999 | Shawver |
| 6,108,200 A | * | 8/2000 | Fullerton .................... 361/686 |
| 6,147,858 A | | 11/2000 | Takahashi |
| D454,347 S | * | 3/2002 | Chung et al. .............. D14/320 |

FOREIGN PATENT DOCUMENTS

| | | |
|---|---|---|
| WO | WO 97/04380 | 2/1997 |
| WO | WO 00/10878 | 3/2000 |

* cited by examiner

*Primary Examiner*—Lynn D. Feild
(74) *Attorney, Agent, or Firm*—Pillsbury Winthrop LLP

(57) ABSTRACT

A protective case for a handheld computer including a computer attachment portion and a computer cover portion. The computer attachment portion has a data connector adapted to be electrically coupled with a data port of the handheld computer. The computer cover portion has a keyboard that is electrically coupled to the data connector on the computer attachment portion. The computer cover portion is movably connected to the computer attachment portion for movement between (a) a computer protecting position wherein the cover portion is positioned in an overlying relationship with respect to the front side of the handheld computer, and (b) a computer operating position wherein the cover portion is moved out of the overlying relationship to enable the user to view a display screen of the handheld computer and operate the keyboard to input data into the processor.

70 Claims, 7 Drawing Sheets

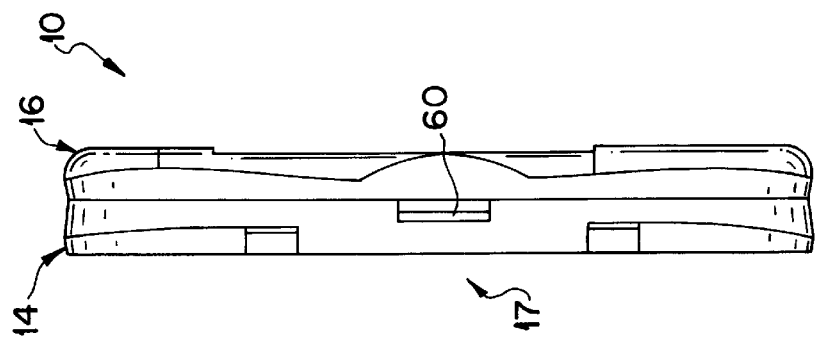
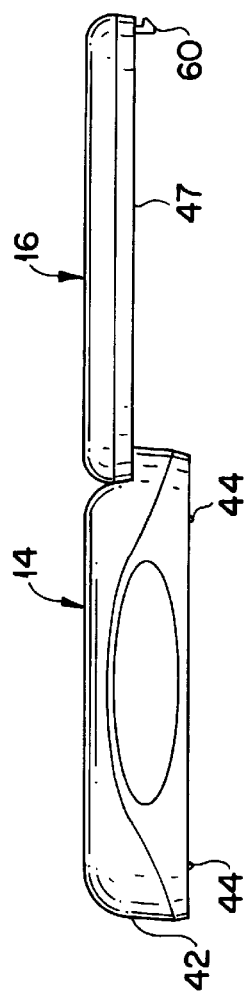
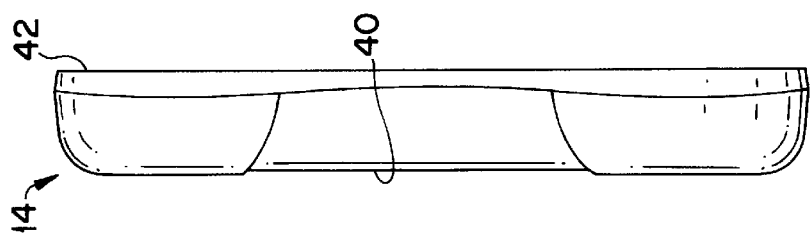

PROTECTIVE CASE WITH A KEYBOARD FOR A HANDHELD COMPUTER

FIELD OF THE INVENTION

The present invention relates to a protective case for a handheld computer and to a handheld computer system including a handheld computer and a protective case for the same.

BACKGROUND OF THE INVENTION

Handheld computers, such as personal organizers, personal digital assistants (PDAs), smart or web-enabled telephones and other devices have grown in popularity partly due to their small size and easy portability. Advancements in technologies have made handheld computers increasingly more powerful, versatile, and affordable, and it is expected that their popularity will continue to increase.

Although handheld computers usually have an outer shell constructed from a rigid material to protect their internal components from damage, various protective cases have been developed to provide additional protection to the handheld computers. Typically, these cases enclose the outer shell and provide both additional protection against damage to the internal components and protection against marring or scratching of the outer shell.

One known method for data entry with handheld computers uses a stylus that the computer user taps on an "on-screen software keyboard." In this method, the display displays a simulated keyboard, simulated buttons, or other indicia on a pressure sensitive display screen, and the user contacts the appropriate location on the screen with the stylus to activate the key, button or indicia at that location.

In another known method, the user moves the stylus on the pressure-sensitive screen in contact therewith in a handwriting-type movement, which software in the computer recognizes and converts into data or commands. The software may be of the type that learns the user's own handwriting, or it may be of the type that recognizes predetermined writing strokes. An example of the latter is known as "Graffiti," which is commonly used for data entry in handheld computers using the Palm OS operating system. Because both of these methods use a blunt object, such as a stylus, for data entry, these computers are often referred to as "pen computers."

Keyboards or keyboard systems have been provided as an improvement over these known methods. One such keyboard system is described in U.S. Pat. No. 6,108,200 issued to Fullerton. This keyboard system is a separate unit that connects to a handheld computer and is placed on a flat surface, such as a table or desktop, to support the handheld computer at a viewing angle with respect to the flat surface to facilitate operation of the handheld computer. The keyboard system of the '200 patent also includes a cover that closes to protect the keyboard system when the keyboard system is not in use. After the user has completed using the handheld computer, he/she removes the computer from the keyboard, closes the keyboard cover to protect the keyboard and thereafter carries the keyboard and computer separately from one another.

PCT Application WO 00/10878 discloses a device that functions as both a keyboard and a case for a handheld computer. In one embodiment disclosed in the PCT Application, the handheld computer is disconnected from the keyboard and the keyboard is folded around the computer to protect the same. To use this embodiment, the user unfolds the keyboard from the computer and then connects the computer's data port to the connector provided on the upper edge of the keyboard. This is relatively inefficient for persons who want to use the keyboard for a quick entry of data because they must go through the hassle of unfolding the keyboard and connecting the computer each time they desire to make a keyboard style entry.

In another embodiment disclosed in the PCT Application, the keyboard remains connected to the keyboard even when the keyboard is folded over the computer for protection. However, in this embodiment, upon unfolding the keyboard, the handheld computer is oriented perpendicularly to the keyboard. That is, the handheld computer is oriented the characters displayed on the screen thereof are rotated 90 degrees relative to the alphabetic and numeric indicia on the keyboard. To solve this orientation problem, this embodiment is provided with a rotating mount that enables the handheld computer to be rotated to a proper orientation after unfolding the keyboard. This is an unsatisfactory arrangement because of the assembly and part costs associated with providing the rotating mount for the computer.

SUMMARY OF THE INVENTION

The present invention provides a protective case for a handheld computer that both provides protection to the handheld computer and also provides a keyboard for efficient data entry in a single unit. The handheld computer may be of any type and will typically include (i) an outer shell configured to be received in a user's hand (ii) a computer processor housed within the outer shell for processing. data, and (iii) a display screen faces outwardly from a front side of the outer shell. The display screen is electrically coupled to the computer processor to enable the processor to display information on the screen. A data port is electrically coupled to the computer processor and is adapted to be electrically coupled to a peripheral device to enable communication of data between the computer processor and the peripheral device.

The protective case includes a computer attachment portion and a computer cover portion. The computer attachment portion has a data connector adapted to be electrically coupled with the data port of the handheld computer. The computer attachment portion is configured to removably receive the handheld computer thereon in an operative position wherein the data port of the handheld computer is electrically coupled to the data connector.

The computer cover portion has a keyboard electrically coupled to the data connector on the computer attachment portion. The keyboard is adapted to transmit a data signal to the computer processor via the electrical coupling of the data connector and the data port. The keyboard enables the user to input data into the computer processor when the handheld computer is received on the computer attachment portion in the operative position thereof. In an exemplary, but non-limiting, embodiment, the data transmitter electrically couples to the data port of said handheld computer by an electro-conductive contact connection. In a further exemplary, but again non-limiting, embodiment, the data connector is fixedly positioned on the computer attachment portion such that upon positioning the handheld computer in the operative position the electro-conductive contact connection is established. The data connector may, as shown in the illustrated exemplary embodiment, comprise a plurality of metal prongs for establishing the electro-conductive contact connection.

The computer cover portion is movably connected to the computer attachment portion for movement between (a) a computer protecting position and (b) a computer operating position. In the computer protecting position, when the handheld computer is in the operative position on the computer attachment portion, the cover portion is positioned in an overlying relationship with respect to the front side of the handheld computer. In the computer operating position, when the handheld computer is in the operative position on the computer attachment portion, the cover portion is moved out of the overlying relationship to enable the user to view the display screen of the handheld computer and operate the keyboard to input data into the processor. The computer cover portion is sized and configured to cover at least the display screen on the front side of the handheld computer in the computer protecting position thereof to protect the front side of the computer.

The keyboard is arranged with respect to the computer attachment portion such that upon relative movement of the cover and attachment portions into the computer operating position, the indicia on the keyboard has the same general orientation from a user's perspective as characters displayed on the display screen of the handheld computer without requiring reorientation of the handheld computer relative to the keyboard to achieve the orientation.

Another aspect of the invention provides a handheld computer system including a handheld computer and a protective case. The handheld computer includes an outer shell configured to be received in a user's hand. A computer processor is housed within the outer shell for processing data and a display screen faces outwardly from a front side of the outer shell. The display screen is electrically coupled to the computer processor to enable the processor to display information on the screen. A data port is electrically coupled to the computer processor and is adapted to be electrically coupled to a peripheral device to enable communication of data between the computer processor and the peripheral device.

The protective case includes a computer attachment portion and a computer cover portion. The computer attachment portion has a data connector adapted to be electrically coupled with the data port of the handheld computer. The computer attachment portion is configured to removably receive the handheld computer thereon in an operative position wherein the data port of the handheld computer is electrically coupled to the data connector. In an exemplary, but non-limiting, embodiment, the data connector electrically couples to the data port of said handheld computer by an electro-conductive contact connection. In a further exemplary, but again non-limiting, embodiment, the data connector is fixedly positioned on the computer attachment portion such that upon positioning the handheld computer in the operative position the electro-conductive contact connection is established. The data connector and the data port may, as shown in the illustrated exemplary embodiment, comprise a plurality of metal prongs for establishing the electro-conductive contact connection.

The computer cover portion has a keyboard electrically coupled to the data connector on the computer attachment portion. The keyboard is adapted to transmit a data signal to the computer processor via the electrical coupling of the data connector and the data port. The keyboard enables the user to input data into the computer processor when the handheld computer is received on the computer attachment portion in the operative position thereof.

The computer cover portion is movably connected to the computer attachment portion for movement between (a) a computer protecting position and (b) a computer operating position. In the computer protecting position, when the handheld computer is in the operative position on the computer attachment portion, the cover portion is positioned in an overlying relationship with respect to the front side of the handheld computer. In the computer operating position, when the handheld computer is in the operative position on the computer attachment portion, the cover portion is moved out of the overlying relationship to enable the user to view the display screen of the handheld computer and operate the keyboard to input data into the processor. The computer cover portion is sized and configured to cover at least the display screen on the front side of the handheld computer in the computer protecting position thereof to protect the front side of the computer.

The keyboard is arranged with respect to the computer attachment portion such that upon relative movement of the cover and attachment portions into the computer operating position, the indicia on the keyboard has the same general orientation from a user's perspective as characters displayed on the display screen of the handheld computer without requiring reorientation of the handheld computer relative to the keyboard to achieve the orientation.

Yet another aspect of the invention provides a protective case for a handheld computer comprising: (a) an outer shell configured to be received in a user's hand, (b) a computer processor housed within the outer shell for processing data, (c) a display screen facing outwardly from a front side of the outer shell, the display screen being electrically coupled to the computer processor to enable the processor to display information on the screen, and (d) a data port coupled to the computer processor, the data port being adapted to communicate data between the computer processor and a peripheral device. The protective case of this aspect of the invention comprises a computer attachment portion having a data transmitter adapted to transfer data to the computer processor of the handheld computer through the data port of the handheld computer. The computer attachment portion is configured to removably receive the handheld computer thereon in an operative position with the data port of the handheld computer and the data transmitter enabling the data transmitter to transfer data to the computer processor through the data port. In an exemplary, but non-limiting, embodiment, the data transmitter electrically couples to the data port of said handheld computer by an electro-conductive contact connection. In a further exemplary, but again non-limiting, embodiment, the data transmitter is fixedly positioned on the computer attachment portion such that upon positioning the handheld computer in the operative position the electro-conductive contact connection is established. The data transmitter may, as shown in the illustrated exemplary embodiment, comprise a plurality of metal prongs for establishing the electro-conductive contact connection.

A computer cover portion has a keyboard with a plurality of keys having indicia representative of alphabetic and/or numeric characters associated therewith. The keyboard is adapted to transmit a data signal to the computer processor via the data transmitter and the data port to thereby enable the user to input data into the computer processor when the handheld computer is received on the computer attachment portion in the operative position thereof. The computer cover portion is movably connected to the computer attachment portion to enable the portions to be moved between (a) a computer protecting position wherein, when the handheld computer is in the operative position on the computer attachment portion, the cover portion is positioned in an overlying relationship with respect to the front side of the handheld computer and (b) a computer operating position wherein, when the handheld computer is in the operative position on the computer attachment portion, the cover portion is moved out of the overlying relationship to enable the user to view the display screen of the handheld computer and operate the keyboard to input data into the processor. The computer cover portion being sized and configured to cover at least the display screen on the front side of the handheld computer in the computer protecting position thereof to protect the display screen of the computer. The keyboard is arranged with respect to the computer attachment portion such that upon relative movement of the cover and attachment portions into the computer operating position the indicia on the keyboard has the same general orientation from a user's perspective as characters displayed on the display screen of the handheld computer without requiring reorientation of the handheld computer relative to the keyboard to achieve the orientation.

Yet another aspect of the invention comprises a handheld computer system comprising a handheld computer and a protective case. The handheld computer comprises (a) an outer shell configured to be received in a user's hand, (b) a computer processor housed within the outer shell for processing data, (c) a display screen facing outwardly from a front side of the outer shell, the display screen being electrically coupled to the processor to enable the processor to display information on the screen, and (d) a data port electrically coupled to the computer processor, the data port being adapted to communicate data between the computer processor and a peripheral device.

The protective case comprises a computer attachment portion having a data transmitter adapted to transfer data to the computer processor of the handheld computer through the data port of the handheld computer, the computer attachment portion having the handheld computer removably received thereon in an operative position with the data port of the handheld computer and the data transmitter enabling the data transmitter to transfer data to the computer processor through the data port. In an exemplary, but non-limiting, embodiment, the data transmitter electrically couples to the data port of said handheld computer by an electro-conductive contact connection. In a further exemplary, but again non-limiting, embodiment, the data transmitter is fixedly positioned on the computer attachment portion such that upon positioning the handheld computer in the operative position the electro-conductive contact connection is established. The data transmitter and the data port may, as shown in the illustrated exemplary embodiment, comprise a plurality of metal prongs for establishing the electro-conductive contact connection.

The protective case also comprises a computer cover portion having a keyboard with a plurality of keys having indicia representative of alphabetic and/or numeric characters associated therewith, the keyboard being adapted to transmit a data signal to the computer processor via the data transmitter and the data port to thereby enable the user to input data into the computer processor. The computer cover portion is movably connected to the computer attachment portion to enable the portions to be moved between (a) a computer protecting position wherein the cover portion is positioned in an overlying relationship with respect to the front side of the handheld computer and (b) a computer operating position wherein the cover portion is moved out of the overlying relationship to enable the user to view the display screen of the handheld computer and operate the keyboard to input data into the processor, the computer cover portion being sized and configured to cover at least the display screen on the front side of the handheld computer in the computer protecting position thereof to protect the display screen of the computer. The keyboard is arranged with respect to the computer attachment portion such that upon relative movement of the cover and attachment portions into the computer operating position the indicia on the keyboard has the same general orientation from a user's perspective as characters displayed on the display screen of the handheld computer without requiring reorientation of the handheld computer relative to the keyboard to achieve the orientation.

Other objects, features, and advantages of the present invention will become apparent from the following detailed description, the accompanying drawings, and the appended claims.

BRIEF DESCRIPTION OF THE DRAWINGS

The present invention is further described in the detailed description which follows, by reference to the noted drawings by way of non-limiting exemplary embodiments, in which like reference numerals represent similar parts throughout the several views of the drawings, and wherein:

FIG. 4 is a left side elevational view of the protective case for a handheld computer shown in FIG. 1;

FIG. 5 is a top view of the protective case for a handheld computer shown in FIG. 1;

FIG. 6 is a right side elevational view of the protective case for a handheld computer shown in FIG. 1;

DETAILED DESCRIPTION OF THE ILLUSTRATED EMBODIMENTS

Figure 1:
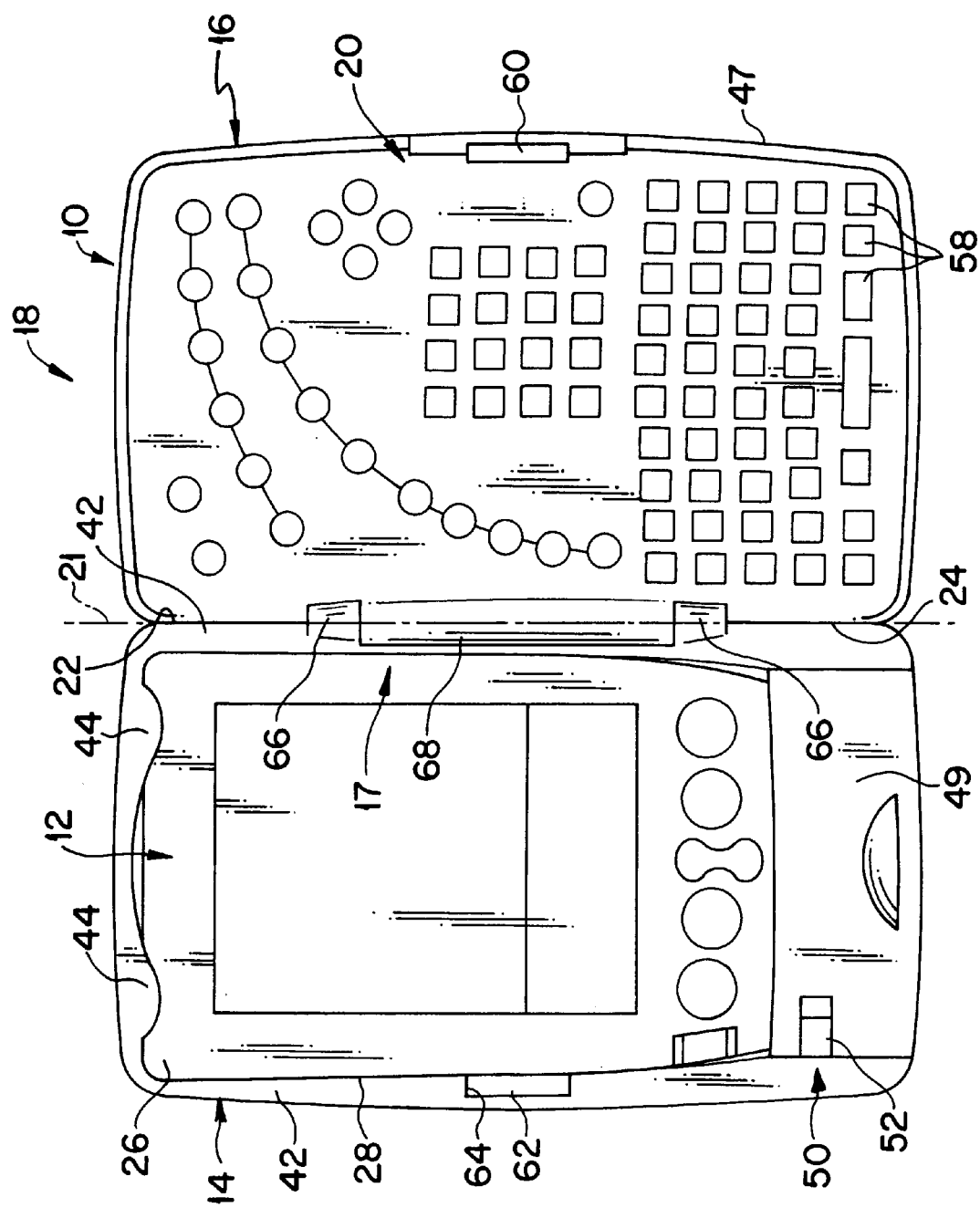
FIG. 1 is a front view of a protective case for a handheld computer in accordance with the exemplary embodiment of the invention, the protective case having a computer attachment portion and a computer cover portion movably connected so as to be in a computer operating position thereof and a handheld computer being received in an operative position on the computer attachment portion of the protective case.

FIGS. 1 and 4–10 show a protective case, generally indicated at 10, for a handheld computer, generally indicated at 12. The protective case 10 includes a computer attachment portion 14 and a computer cover portion 16 movably connected to one another for movement between a computer protecting position and a computer operating position. In FIG. 1, the cover portion 16 of the protective case 10 is in its computer operating position and the handheld computer 12 is in an operative position thereof in the computer attachment portion 14. When the handheld computer 12 is in the operative position thereof, the protective case 10 and the handheld computer 12 together constitute a handheld computer system, generally indicated at 18. The protective case 10 includes a keyboard 20 on its computer cover portion 16, which will be described in greater detail below.

In the illustrated embodiment, the computer attachment portion 14 may be pivotally connected to the computer cover portion 16 by hinge structure 17. The attachment and cover portions 14, 16 pivot about a pivot axis 21 located between respective adjacent peripheral edges 22, 24 thereof. However, the attachment and cover portions 14, 16 may be movably connected to one another by any suitable connecting arrangement, such as, for example, a living hinge or a dual-pivot hinge. Likewise, the connection between the attachment and cover portions 14, 16 may be between the top edge of the cover portion 16 and the bottom edge of the attachment portion 14.

Figure 8:
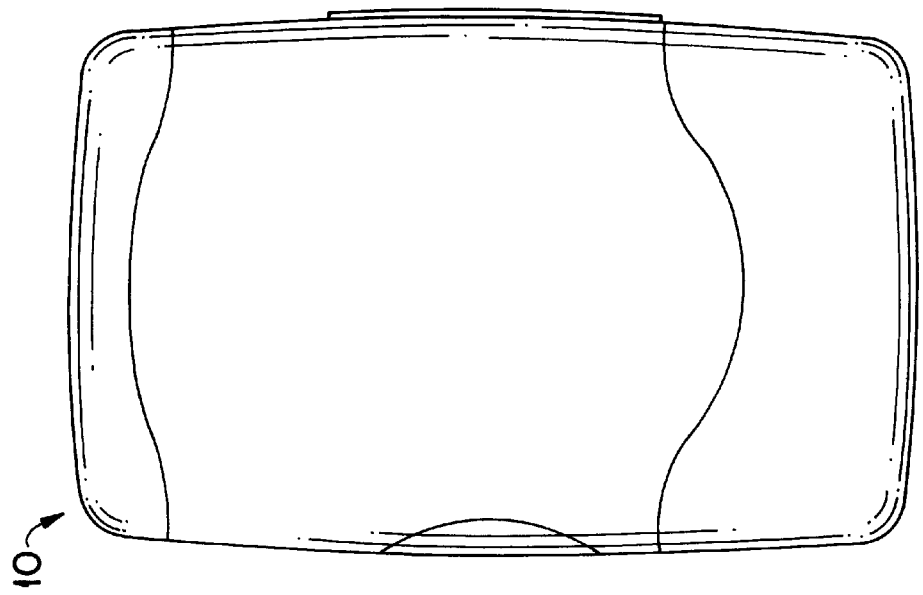
FIG. 8 is a rear elevational view of the protective case for a handheld computer shown in FIG. 1 with the handheld computer being positioned in an operative position on the computer attachment portion of the protective case and the computer cover portion being moved to a computer protecting position wherein it is positioned in an overlying relationship with respect to the front side of the handheld computer.
Figure 7:
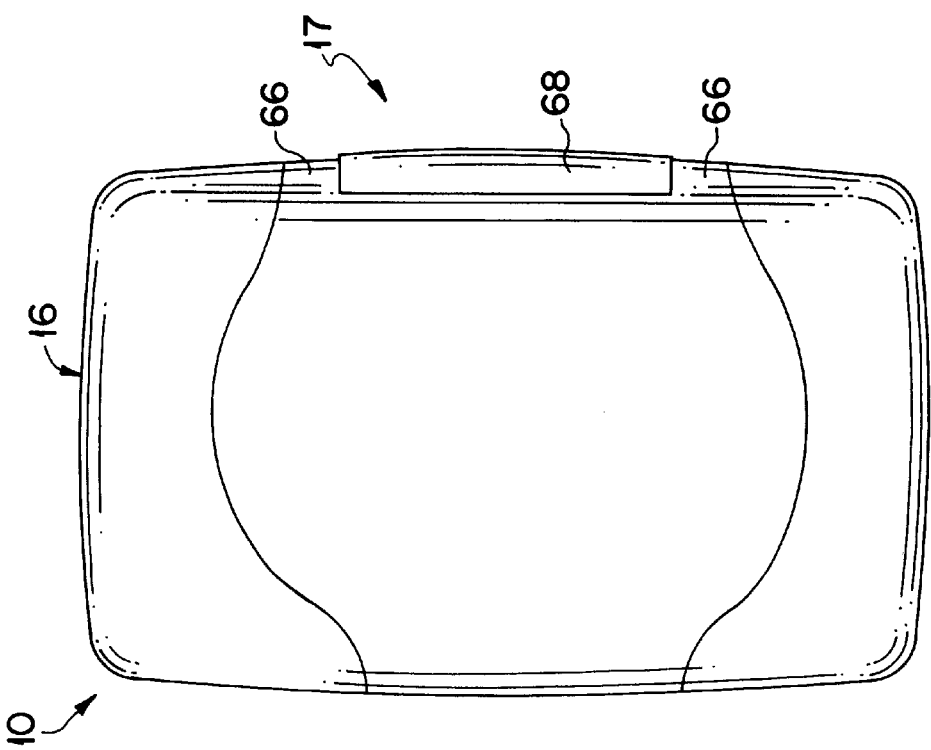
FIG. 7 is a front elevational view of the protective case for a handheld computer shown in FIG. 1 with the handheld computer being positioned in an operative position on the computer attachment portion of the protective case and the computer cover portion being moved to a computer protecting position wherein it is positioned in an overlying relationship with respect to the front side of the handheld computer.

In the computer protecting position, when the handheld computer 12 is in its operative position on the computer attachment portion 14, the cover portion 16 is positioned in an overlying relationship with respect to a front side 26 of the handheld computer 12, as best shown in FIGS. 7 and 8. In the computer operating position, the computer cover portion 16 is moved out of the overlying relationship with respect to the front side 26 of the handheld computer 12 into a side-by-side relationship to enable the user to view the computer's display screen and operate the keyboard 20, as best shown in FIG. 1.

Although the present invention is primarily concerned with the protective case 10, a general description of the handheld computer 12 with which the case 10 is designed to be used is believed to be worthwhile to facilitate understanding the construction and operation of the case 10 of the present invention.

The handheld computer 12 comprises an outer shell 28, which is made from a rigid material, such as plastic, metal or a combination thereof. In the illustrated embodiment, the outer shell 28 has a generally rectangular configuration. However, the outer shell 28 may have any configuration, such as being ergonomically designed to comfortably fit in a user's hand. The handheld computer 12 illustrated in the figures is an IBM Workpad, but the case 10 of the invention may be modified for use with any type of handheld computer, such those commercially available from, for example, Palm (3 Com), Handspring, Casio, or any other manufacturers of these types of devices.

Figure 2:
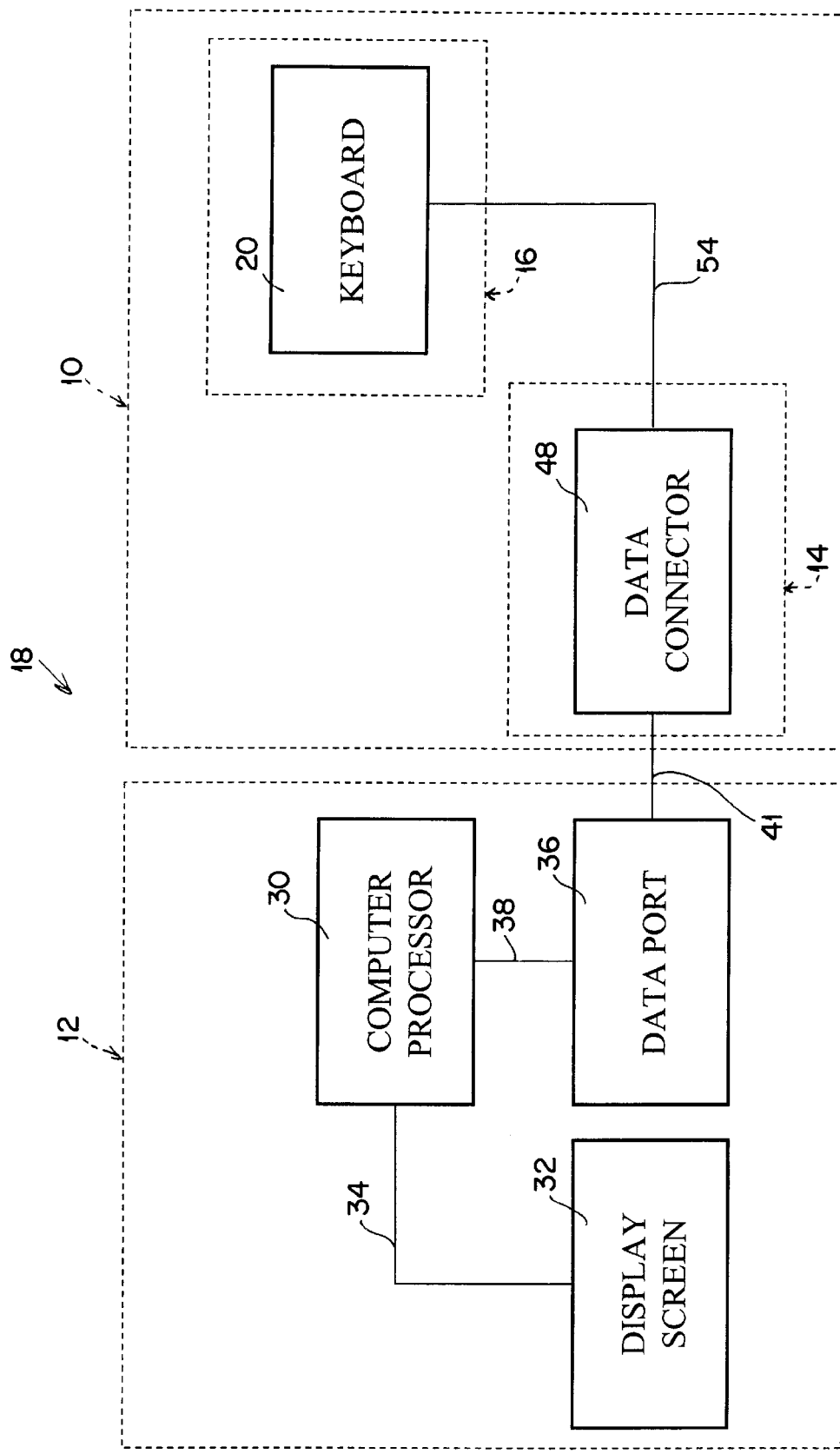
FIG. 2 is a schematic diagram of the protective case for a handheld computer shown in FIG. 1.

As shown schematically in FIG. 2, a computer processor 30 is housed within the outer shell 28 for protection. The computer processor 30 is adapted for receiving signals from its on-board input system and/or peripheral devices, such as a keyboard or personal computer docking cradle, coupled to its data port 36 and processing those data signals. In the present application, the term processor is used to denote the general processing system for operating the computer 12 and contemplates that this system may be provided by a single processor responsible for all computer functions, or a series of interconnected processors each dedicated to discrete functions of the computer 12.

A display screen 32 is electrically coupled, as schematically represented at 34, to the computer processor 30 to enable the computer processor 30 to display information on the screen 32. The display screen 32 is disposed on the front side 26 of the outer shell 28 so as to face outwardly therefrom through an opening in the shell 28. A data port 36 is electrically coupled, as schematically represented at 38, to the processor 30. The data port 36 is adapted to be electrically coupled to a peripheral device, such as a keyboard, or a personal computer docking cradle, to enable communication of data between the computer processor 30 and the peripheral device.

In the illustrated handheld computer 12, the display screen 32 is an LCD screen of the pressure-sensitive type that enables the user to input data or commands into the processor 30 by contacting the screen 32 with a blunt object, such as a stylus or finger, in a handwriting-type manner as described in the above background section to activate a series of pressure-sensitive elements embedded within the screen 32. A series of computer executable instructions converts the handwriting type movements into data for processing and/or storage. The input system is preferably supplemented with a series of computer executable instructions executable by the computer processor 30 that display simulated input elements on the display screen 32. Such simulated input elements may include menu elements of a simulated pull-down menu, a simulated keyboard having a plurality of simulated keys each associated with a certain portion of the screen, or icons that invoke predetermined macro function. The input system is configured to determine when a user invokes a simulated input element, such as an icon or menu element displayed on the display screen 32 or the "key" of a simulated keyboard displayed on the screen 32. For example, in "pen computers", the user may contact the screen with a stylus so as to activate a input element, such as an icon displayed on the screen 32, and the processor 30 as directed by the computer executable instructions determines that element has been invoked by sensing actuation of the pressure-sensitive elements at the associated location on the screen 32. The processor then executes a command or data input corresponding to the invoked simulated input element.

Alternatively, the input system of the computer could be operated by maneuvering a cursor via a mouse, trackball or tactile control pad on the outer shell 28 and actuating a button to invoke a simulated input element when the cursor is positioned on that input element. The present invention is not particularly concerned with the manner in which the input system of the computer 12 functions and the foregoing examples of achieving such input have been provided solely as illustrative guides to familiarize the reader with the general types of input systems that can be used in such handheld computers.

In another alternative, the case 10 could be used with a computer 12 that is designed without an input system and could be of the type that information is input into via the keyboard 20 or by connecting with a PC which uploads data to the handheld computer 12 (commonly referred to as synchronizing). Although one could not input information into this type of computer 12, the computer 12 could still function to alert the person carrying the computer 12 of upcoming appointments or tasks by emitting an audible signal and displaying information concerning the appointment or task on its display screen 32, a typical function found in many handheld computers 12.

The handheld computer 12 includes non-volatile memory for storing executable programs and data which is to be retrieved at later times, but may include other types of sufficient memory, such as RAM, as well.

The computer attachment portion 14 is sized and configured to completely cover a rear side (not shown) of the handheld computer 12 when the handheld computer 12 is received thereon in the operative position thereof. Similarly, the computer cover portion 16 is sized and configured to completely cover the front side 26 of the handheld computer 12 when the cover portion 16 is received thereon in the computer protecting position thereof to protect the front side 26 of the handheld computer 12 against marring or scratching. Preferably, the cover portion 16 completely covers the front side of the computer 12. However, absolutely complete coverage is not necessary, but it should cover at least the screen 32, which is the portion of the computer 12 most prone to damage.

Alternatively, the computer attachment portion 14 could have an open frame that does not completely cover the rear face of the computer 12 and, instead, simply serves as a frame for supporting the computer 12 thereon in its operative position. In this alternative construction, the computer attachment portion 16 does not function to protect the rear side of the computer 12, which is entirely outer shell and thus protected anyway. Preferably, however, the attachment portion 14 does cover the rear side of the computer 12 so as to provide enhanced protection.

In the illustrated embodiment, the computer attachment portion 14 and the computer cover portion 16 and their respective outer shells have generally rectangular configurations that correspond with the configuration of the outer shell 28 of the handheld computer 12. Alternatively, the computer attachment portion 14 and the computer cover portion 16 could have configurations that differ from the shape of the computer 12.

The outer shells of the computer attachment portion 14 and the computer cover portion 16 are each formed from a substantially rigid material, such as plastic, metal, or a combination thereof. Alternatively, the outer shells of the attachment portion 14 and the computer cover portion 16 could be made from a vinyl, leather, or fabric and lined with padding to provide protection to the computer 12.

The outer shell of the computer attachment portion 14 includes a rear wall 40, which completely covers the rear side of the handheld computer 12 in the operative position thereof. A pair of side walls 42 extends forwardly from the rear wall 40 to define a computer receiving space along the rear wall 40 and engages side edges of the outer shell 28 when the handheld computer 12 is positioned in the operative position thereof. The size of the computer attachment portion's outer shell varies depending upon the handheld computer's size, thus the size of the space defined by the walls 42 may be varied according to the handheld computer's shape and size as well.

A pair of retaining portions 44 extend downwardly from a top wall extending from the rear wall 40 to assist in releasably retaining the handheld computer 12 in the operative position on the computer attachment portion 14. Specifically, as shown in FIG. 1, the top edge of the computer 12 is received underneath the retaining portions 44 and the retaining portions 44 engage the front side 26 of the outer shell 28. When the computer 12 is in its operative position, its data port 36 is electrically coupled to a data connector 48, schematically represented at 41, which is carried on the computer attachment portion 14.

The data connector 48 is disposed within a data connector housing portion 49 with a portion, such as a plurality of metal prongs or other electrical coupling members, protruding slightly upwardly therefrom for coupling to the data port 36 of the computer 12. The type of arrangement used for the connector 48 will be dictated by the type of computer 12 for which the case 10 is designed. Specifically, the arrangement for the connector will be dictated by the construction of the data port 36 on the computer 12. For example, the data connector 48 may be configured to cooperate with different handheld computers, such as a Handspring Visor, a Palm III, a Palm V, a IBM Workpad, or any other handheld computer.

A locking mechanism 50 is provided within the data connector housing portion 49 and functions to secure the handheld computer 12 in its operative position within the outer shell of the computer attachment portion 14. In the illustrated embodiment, the data connector housing portion 49 slides downwardly (as viewed in the Figures) to enable the top edge of the computer 12 to be slid underneath the retaining tabs 44 and then is slid upwardly to engage the lower edge of the computer 12, which in turn electrically couples the data connector 48 to the data port 36. The locking mechanism 50 is provided by a slide switch 52, which is receivable in an opening in the adjacent side wall of the computer attachment portion 14. Specifically, the lock switch 52 moves to a locked position wherein it is received in the opening to lock the data connector housing portion 49 in engagement with the bottom edge of the handheld computer 12 and retain the computer 12 in its operative position in cooperation with the retaining tabs 44. Movement of the switch 52 to its unlocking position withdraws the switch 52 from its opening to free the data connector housing portion 49 for downward movement away from the bottom edge of the computer 12. This allows the computer 12 to be manually removed from the attachment portion 14.

In general, the retaining tabs 44, the data connector housing portion and the locking mechanism 50 function together as a computer retainer to retain the handheld computer 12 on the computer attachment portion 14 of the protective case 10. However, the computer retainer could have any construction suitable for releasably retaining the handheld computer in its operative position on the computer attachment portion 14. For example, the retainer could be provided by one or more releasable Velcro®, buckled or buttoned straps, one or more claw latches that snappingly engage the computer's outer shell, one or more cams within a fixed data housing connector portion that are forced upwardly by switch movement against the bottom edge of the computer 12 and work in cooperation with tabs 44, or a magnetic lining on the rear wall 40 for magnetically attracting metal in the computer's outer shell. Likewise, the computer attachment portion 14 could be segmented into two separable sections with "pockets" for retaining the peripheral edges of the computer's outer shell. In this arrangement, the user places one end or side of the computer into the pocket of one section and then couples the other section to the first section with the pocket of the other section receiving the opposite end or side of the computer's outer shell. These pockets would function as the computer retainer to retain the computer 12 on the attachment portion 14. To remove the computer 12, the user simply separates the two sections of the attachment portion and removes the computer 12 from the pocket.

The computer cover portion 16 has an outer shell including an outer wall 47 that defines an interior space (not shown) in which the keyboard 20 is fixedly mounted. The keyboard 20 is secured, for example, with adhesive or other bonding material, within the interior space defined by the outer wall 47. The keyboard 20 is electrically coupled to the data connector 48 by an electric cable, wire or ribbon connector 54 that extends through the hinge structure 17. Alternatively, this electrical connection could simply extend across the portions 14, 16 without passing through the hinge 17. However, passing the electrical connection through the hinge 17 is preferred for aesthetic purposes.

Figure 3:
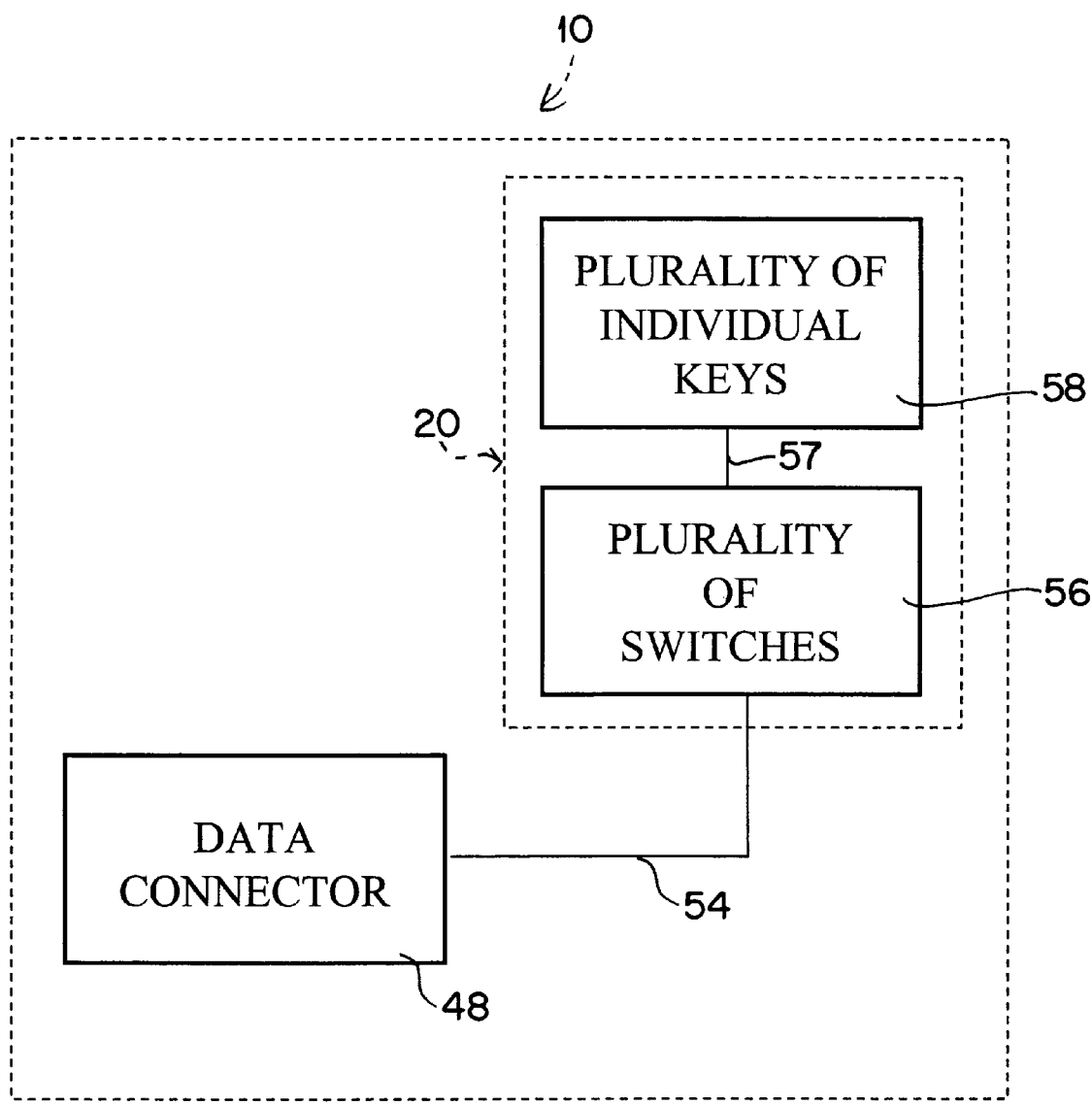
FIG. 3 is a schematic diagram showing the keyboard of FIG. 2 in greater detail.

The keyboard 20 includes a plurality of switches 56 and a plurality of individual keys 58 (FIG. 3). Each switch 56 is electrically coupled to the data connector 48 via the wire 54 and each individual key 58 is positioned adjacent an associated switch 56. Movement of the keys 58 moves the associated switch 56, which signals the computer processor 30 via the coupling of the data port 36 and the data connector 48 that one or more keys 58 have been depressed. This relationship is schematically represented at 57 in FIG. 3.

In the illustrated embodiment, the keyboard 20 does not have its own power source and instead draws power from the handheld computer 12 through the electrical coupling between the data port 36 and the data connector 48. Alternatively, the keyboard 20 may include an on-board power supply, such as non-rechargeable or rechargeable batteries or an electrical plug connectable to an AC or DC power source.

The keys in the illustrated keyboard include a plurality of keys corresponding to the letters of the alphabet and a plurality of keys corresponding to the numbers 0–9 (marked by appropriate indicia for identifying the key). Other keys corresponding to conventional symbols are also provided along with appropriate indicia. The keyboard also has a number of keys dedicated to predetermined macro functions that are typically used in word processing. These macro keys include cut, paste, copy, undo, among others. These macro keys, in cooperation with the keyboard driver program in the computer or in the keyboard processor as described below, invoke predetermined commands that are often utilized by the user when operating the computer 12. The Backlight key commands the computer to backlight the screen 32, if the computer 12 has such capability. The particular layout and types of keys are not of critical importance to the inventions and other types and layouts may be used. However, it should be noted that the arrangement of the keyboard 20 with respect to the with respect to the computer attachment portion is such that upon relative movement of the cover and attachment portions into the computer operating position, the indicia on the keyboard 20 has the same general orientation from a user's perspective as characters displayed on the display screen of the handheld computer without requiring reorientation of the handheld computer relative to the keyboard to achieve the orientation, as is the case in the PCT Application mentioned above. This enables the user to easily the use the keyboard 20 simply by moving the portions 12 and 14 apart to their computer operating position.

The keyboard 20 may have any construction suitable for translating manual keystrokes applied to the keys thereof into corresponding signals usable by the computer processor 30. The exemplary embodiment of the keyboard is provided for illustrative purposes only and is not intended to be limiting in any manner. For example, the keyboard 20 could be of the type that has a pressure-sensitive touch pad segmented into a number of keys, instead of having a number of individual switch actuated keys. The pressure-sensitive pad would create and transmit a signal indicating that a certain area of the pad corresponding to an associated key had been pressed. Other types of keyboards can be readily envisioned.

The computer attachment portion 14 and the computer cover portion 16 provide cooperating structures in the form of latch portions 60, 62 that cooperate with one another to releasably retain the computer cover portion 16 in the computer protecting position thereof. For example, the latch portion 60 in the illustrated embodiment is a latch hook provided on either one of the computer attachment portion 14 or the computer cover portion 16. The latch portion 62 in the illustrated embodiment is a hook receiving member with a hook receiving opening 64 provided on the other of the computer attachment portion 14 or the computer cover portion 16.

The latch hook 60 extends from the outer wall 47 of the computer cover portion 16 while the hook receiving member 62 extends from the computer engaging wall 42 of the computer attachment portion 14. The latch hook 60 and the hook receiving member 62 are configured to engage one another in a releasably interlocked relation, i.e., the latch hook 62 being received in the hook receiving opening 64, to releasably retain the computer cover portion 16 in the computer protecting position thereof. Similarly, the latch hook 60 and the hook receiving member 62 may be disengaged (i.e., the latch hook 60 may be manually removed from the hook receiving opening 64) to release the computer cover portion 16 for movement to the computer operating position thereof from the computer protecting position thereof relative to the computer attachment portion 14.

Figure 9:
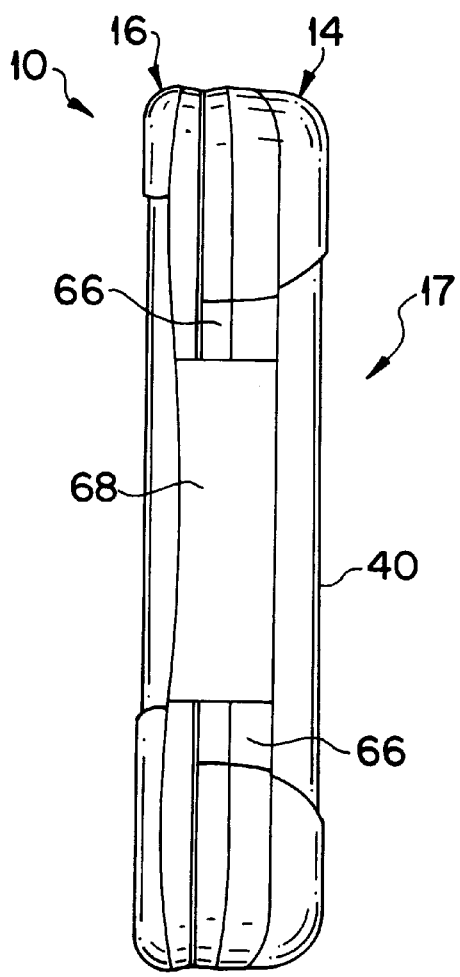
FIG. 9 is a left side elevational view of the protective case for a handheld computer shown in FIG. 8.
Figure 10:
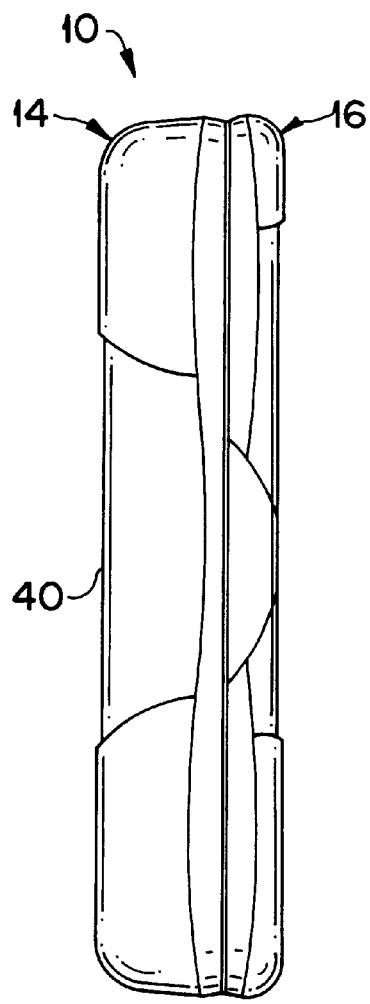
FIG. 10 is a right side elevational view of the protective case for a handheld computer shown in FIG. 8.

As noted above, the protecting case 10 has the hinge structure 17 which permits the attachment and cover portions 14,16 to pivot with respect to one another about the axis 21. As shown in FIGS. 1, 7, and 9, each hinge structure 17 includes a cylindrical shaft member (not shown) extending between a pair of associated pivotal journaling members 66, which extend from the peripheral edge 22 of the computer attachment portion 14. An elongated pivotal journaling member 68 extends from the peripheral edge 24 of the computer cover portion 16. The shaft member extends through the elongated pivotal journaling member 68 to be received between the pair of associated pivotal journaling members 66 in a journaling opening (not shown) formed in the associated journaling members 66. Thus, the cylindrical shaft member forms the pivot axis 21. The shaft member is positioned relative to the peripheral edges 22, 24 of the attachment and cover portions 14, 16, respectively, so as to allow the protective case 10 to pivot about the pivot axis 21 without obstruction.

Alternatively, in a configuration not shown, the hinge structure could consist of a series of aligned journaling members extending from the attachment portion 14 and or the cover portion 16. A pin-type axle member fixed on the other portion passes through the journaling members and is retained therein by suitable securing means, such as a snap-fit received relation. Generally, any suitable arrangement may be used to movably connect the attachment and cover portions together.

The size and configuration of the illustrated embodiment is advantageous because the case 10 can be opened to provide access to the keyboard 20 and viewing of the screen 32 while holding the case 10 in one hand, while the other hand is used for operation of the keyboard 20. Because the hinges are free pivoting in the illustrated embodiment, the user should support both sides of the case 10 in his/her hand. Also, the case can be laid down flat on a support surface, such as a desktop, during usage thereof.

In the embodiment of FIGS. 1–10, a keyboard driver software program is provided for loading into the non-volatile memory of the computer 12. The keyboard driver program comprises a series of computer executable instructions that are executable by the computer processor 30 to interpret the data signals generated by the keyboard 20 based on the keystrokes applied thereto and converts those signals into instructions which are recognizable and executable by the computer processor 30 and its operating system. For example, in computer having Palm OS as its operating system, the keyboard driver software interprets data signals transmitted by the keyboard 20 and converts them into instructions which Palm OS recognizes and can cause the processor 30 to execute. Likewise, the keyboard driver program could be adapted to perform the same function in a computer using Microsoft Windows CE as its operating system.

Figure 11:
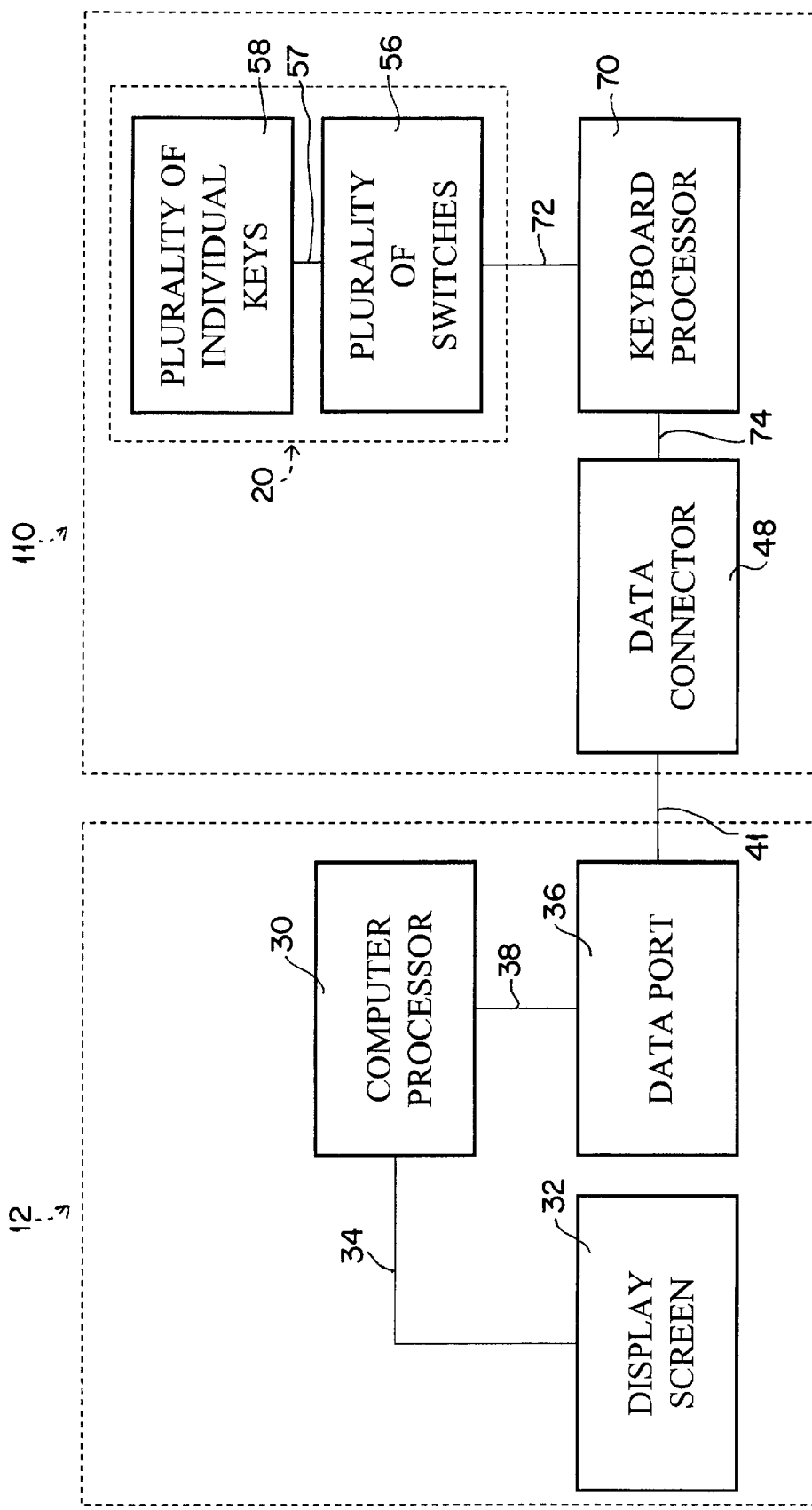
FIG. 11 is a schematic diagram of an alternative protective case for a handheld computer wherein the alternative protective case includes a keyboard processor.

FIG. 11 schematically illustrates a protective case 110, which includes a keyboard processor 70. The protective case 110 is the same in construction and operation as the protective case 10, except for the keyboard processor 70 and its electrical couplings, and the above description with respect to the protective case 10 will suffice for both. Similar elements of each protective case 10, 110 have identical reference numerals.

As illustrated in FIG. 11, the keyboard processor 70 is electrically coupled, as schematically represented at 72, to the plurality of switches 56. The keyboard processor 70 is adapted to process the keystrokes applied to the keyboard 20 by the user and transmit a data signal based on the keystrokes through wires connecting the data connector 48, the data port 36 and the computer processor 30. An electric cable, wire or ribbon cable 74 couples the keyboard processor 70 through the hinge structure 17 to the data connector 36.

The keyboard processor 70 has the appropriate keyboard driver program embedded therein for the type of computer for which the case 10 is designed. As a result, there is no need to upload a separate keyboard driver program to the computer 30.

OPERATION

The operation of the protective case 10 of the handheld computer system 18 will now be described.

The user connects the handheld computer 12 to the protective case 10. To effect this connection, the data connector housing portion 49 is slid downwardly, the upper end of the handheld computer 12 is positioned beneath the pair of retaining portions 44, and then the computer 12 is pivoted downwardly into its operative position in the computer attachment portion 14. Then the user slides the data connector housing portion 49 upwardly into engagement with the bottom edge of the computer 12, which in turn engages the data port 36 of the handheld computer 12 with the data connector 48 to affect the electric coupling therebetween. The user then moves the locking switch 52 into its locking position to lock data connector housing portion 49 in place and retain the computer 12 in the operative position.

FIGS. 7–10 show the computer cover portion 16 in its computer protecting position, wherein the outer shells of the attachment and cover portions 14, 16 cooperate to completely enclose the handheld computer 12. In this position, the latch hook 60 is received in the hook receiving opening 64 to releasably retain the computer cover portion 16 in the computer protecting position thereof.

To view the display screen 32 or operate the keyboard 20, a user disengages the hook 60 from the hook receiving opening 64 and pivots the attachment and cover portions 14, 16 out of the overlying relationship with one another (to the computer operating position shown in FIG. 1). The latch hook 60 and the hook receiving member 62 are configured to disengage so that the latch hook 62 may be removed from the hook receiving opening 64 using a predetermined amount of manual force applied by the user's finger or thumb. When the latch hook 60 and the hook receiving member 62 are disengaged from one another, the computer cover portion 16 may be moved from its computer protecting position, such as, for example, about the pivot axis 21 to its computer operating position.

Once the computer cover portion 16 moves into its computer operating position, the display screen 32 and/or keyboard 20 become fully accessible to the user. For example, when a user manually depresses one of the keys 58 of the keyboard 20, the switch 56 associated with the depressed key 58 signals the computer processor 30 that the key 58 associated therewith has been depressed. The keyboard 20 then transmits data signals based on keystrokes applied to the individual keys 58 by a user to the computer processor 30 via the coupling between the data port 36 and the data connector 48. That way, the user may input data into the computer processor 30 using the keyboard 20 when the handheld computer 12 is in its operative position.

After use of the data screen 32 and/or keyboard 20, the user can manually pivot the cover portion 16 from its computer operating position to its computer covering position about the pivot axis 21. To retain the cover portion 16 in its computer covering position, the user may apply a manual force to the protective case 10 so as to move the latch hook 60 into engagement with the hook receiving member 62. The latch hook 60 may be received within the hook receiving opening 64, for example, by a snap fit, so that the computer cover portion 16 is retained in its computer protecting position.

While the principles of the invention have been made clear in the illustrative embodiments set forth above, it will be apparent to those skilled in the art that various modifications may be made to the structure, arrangement, proportion, elements, materials, and components used in the practice of the invention.

What is claimed:

1. A protective case for a handheld computer comprising: (a) an outer shell configured to be received in a user's hand, (b) a computer processor housed within said outer shell for processing data, (c) a display screen facing outwardly from a front side of said outer shell, said display screen being electrically coupled to said computer processor to enable said processor to display information on said screen, and (d) a data port coupled to said computer processor, said data port being adapted to be electrically coupled to a peripheral device to enable communication of data between said computer processor and the peripheral device, said protective case comprising:

a computer attachment portion having a data connector adapted to be electrically coupled with the data port of said handheld computer, said computer attachment portion being configured to removably receive said handheld computer thereon in an operative position wherein said data port of said handheld computer is electrically coupled to said data connector; and a computer cover portion having a keyboard with a plurality of keys having indicia representative of alphabetic and/or numeric characters associated therewith, said keyboard being electrically coupled to said data connector on said computer attachment portion and being adapted to transmit a data signal to said computer processor via the electrical coupling of said data connector and said data port to thereby enable the user to input data into said computer processor when said handheld computer is received on said computer attachment portion in said operative position thereof;

said computer cover portion being movably connected to said computer attachment portion to enable said portions to be moved between (a) a computer protecting position wherein, when said handheld computer is in said operative position on said computer attachment portion, said cover portion is positioned in an overlying relationship with respect to the front side of the handheld computer and (b) a computer operating position wherein, when said handheld computer is in said operative position on said computer attachment portion, said cover portion is moved out of said overlying relationship to enable said user to view the display screen of said handheld computer and operate said keyboard to input data into said processor, said computer cover portion being sized and configured to cover at least the display screen on the front side of said handheld computer in said computer protecting position thereof to protect the display screen of said computer;

said keyboard being arranged with respect to said computer attachment portion such that upon relative movement of said cover and attachment portions into said computer operating position the indicia on said keyboard has the same general orientation from a user's perspective as characters displayed on the display screen of said handheld computer without requiring reorientation of said handheld computer relative to said keyboard to achieve said orientation.

2. A protective case according to claim 1, wherein said computer attachment portion has a computer retainer that releasably retains said handheld computer in said operative position on said computer attachment portion.

3. A protective case according to claim 2, wherein said computer cover portion is sized and configured to completely cover the front side of said handheld computer in said computer protecting position thereof to protect the front side of said computer.

4. A protective case according to claim 3, wherein said computer attachment portion is pivotally connected to said cover portion.

5. A protective case according to claim 4, wherein said computer attachment portion is sized and configured to completely covers a rear side of said handheld computer in said operative position thereof.

6. A protective case according to claim 5, wherein said computer attachment portion and said computer cover portion each have an outer shell, said outer shells being configured such that, when said handheld computer is in said operative position thereof and said computer cover portion is in said computer protecting position thereof, said outer shells cooperate to completely enclose said handheld computer.

7. A protective case according to claim 6, wherein the outer shells of said computer attachment portion and said computer cover portion are each formed from a substantially rigid material.

8. A protective case according to claim 7, wherein substantially rigid material is plastic.

9. A protective case according to claim 7, wherein said computer attachment portion and said computer cover portion provide cooperating structures that cooperate with one another to releasably retain said computer cover portion in said computer protecting position thereof.

10. A protective case according to claim 9, wherein said cooperating structures include a latch portion provided on one of said cover and attachment portions and a latch portion provided on the other of said cover and attachment portions, said latch portions being engageable with one another in a releasably interlocked relation to releasably retain said computer cover portion in said computer protecting position thereof, said latch portion being disengageable to release said computer cover portion for movement from said computer protecting position thereof.

11. A protective case according to claim 10, wherein one of said latch portions is a latch hook and wherein the other of said latch portions is a hook receiving member with a hook receiving opening, said hook being receivable in said hook receiving opening to provide said interlocked relation and releasably retain said computer cover portion in said computer protecting position thereof, said hook being removable from said hook receiving opening to release said computer cover portion for movement from said computer protecting position thereof.

12. A protective case according to claim 6, wherein said computer cover portion and said computer attachment portion are each made from a flexible material.

13. A protective case according to claim 1, further comprising:

a keyboard processor electrically coupled to said keyboard and said keyboard processor being adapted to process the keystrokes applied to said keyboard by the user and transmit said data signal based on said keystrokes to said computer processor via the electrical coupling of said data connector and said data port to thereby enable the user to input data into said computer processor when said handheld computer is received on said computer attachment portion in said operative position thereof.

14. A protective case according to claim 13, wherein said keyboard comprises a plurality of switches each electrically coupled to said keyboard processor and a plurality of individual keys each positioned adjacent an associated one of said switches such that manually depressing one of said keys moves the switch associated with the depressed key, each of said switches being adapted such that movement thereof signals said keyboard processor that the key associated therewith has been depressed.

15. A protective case according to claim 1, wherein said data connector electrically couples to the data port of said handheld computer by an electro-conductive contact connection.

16. A protective case according to claim 15, wherein said data connector is fixedly positioned on said computer attachment portion such that upon positioning said handheld computer in said operative position said electro-conductive contact connection is established.

17. A protective case according to claim 16, wherein said data connector comprises a plurality of metal prongs for establishing said electro-conductive contact connection.

18. A handheld computer system comprising:
(A) a handheld computer comprising:
an outer shell configured to be received in a user's hand,
a computer processor housed within said outer shell for processing data,
a display screen facing outwardly from a front side of said outer shell, said display screen being electrically coupled to said processor to enable said processor to display information on said screen, and
a data port electrically coupled to said computer processor, said data port being adapted to be electrically coupled to a peripheral device to enable communication of data between said computer processor and the peripheral device, (B) a protective case comprising:

a computer attachment portion having a data connector electrically coupled with the data port of said handheld computer, said computer attachment portion having said handheld computer removably received thereon in an operative position wherein said data port of said handheld computer is electrically coupled to said data connector; and a computer cover portion having a keyboard with a plurality of keys having indicia representative of alphabetic and/or numeric characters associated therewith, said keyboard being electrically coupled to said data connector on said computer attachment portion and being adapted to transmit a data signal to said computer processor via the electrical coupling of said data connector and said data port to thereby enable the user to input data into said computer processor;

said computer cover portion being movably connected to said computer attachment portion to enable said portions to be moved between (a) a computer protecting position wherein said cover portion is positioned in an overlying relationship with respect to the front side of the handheld computer and (b) a computer operating position wherein said cover portion is moved out of said overlying relationship to enable said user to view the display screen of said handheld computer and operate said keyboard to input data into said processor, said computer cover portion being sized and configured to cover at least the display screen on the front side of said handheld computer in said computer protecting position thereof to protect the display screen of said computer;

said keyboard being arranged with respect to said computer attachment portion such that upon relative movement of said cover and attachment portions into said computer operating position the indicia on said keyboard has the same general orientation from a user's perspective as characters displayed on the display screen of said handheld computer without requiring reorientation of said handheld computer relative to said keyboard to achieve said orientation.

19. A system according to claim 18, wherein said computer attachment portion has a computer retainer releasably retaining said handheld computer in said operative position on said computer attachment portion.

20. A system according to claim 19, wherein said computer cover portion is sized and configured to completely cover the front side of said handheld computer in said computer protecting position thereof to protect the front side of said computer.

21. A system according to claim 20, wherein said computer attachment portion is pivotally connected to said cover portion.

22. A system according to claim 21, wherein said computer attachment portion is sized and configured to completely covers a rear side of said handheld computer in said operative position thereof.

23. A system according to claim 22, wherein said computer attachment portion and said computer cover portion each have an outer shell, said outer shells being configured such that, when said computer cover portion is in said computer protecting position thereof, the outer shells of said cover portion and said attachment portion cooperate to completely enclose said handheld computer.

24. A system according to claim 23, wherein the outer shells of said computer attachment portion and said computer cover portion are each formed from a substantially rigid material.

25. A system according to claim 24, wherein substantially rigid material is plastic.

26. A system according to claim 24, wherein said computer attachment portion and said computer cover portion provide cooperating structures that cooperate with one another to releasably retain said computer cover portion in said computer protecting position thereof.

27. A system according to claim 26, wherein said cooperating structures include a latch portion provided on one of said cover and attachment portions and a latch portion provided on the other of said cover and attachment portions, said latch portions being engageable with one another in a releasably interlocked relation to releasably retain said computer cover portion in said computer protecting position thereof, said latch portion being disengageable to release said computer cover portion for movement from said computer protecting position thereof.

28. A system according to claim 27, wherein one of said latch portions is a latch hook and wherein the other of said latch portions is a hook receiving member with a hook receiving opening, said hook being receivable in said hook receiving opening to provide said interlocked relation and releasably retain said computer cover portion in said computer protecting position thereof, said hook being removable from said hook receiving opening to release said computer cover portion for movement from said computer protecting position thereof.

29. A system according to claim 23, wherein the outer shells of said computer cover portion and said computer attachment portion are each made from a flexible material.

30. A system according to claim 18, further comprising:

a keyboard processor electrically coupled to said keyboard and said keyboard processor being adapted to process the keystrokes applied to said keyboard by the user and transmit said data signal based on said keystrokes to said computer processor via the electrical coupling of said data connector and said data port to thereby enable the user to input data into said computer processor when said handheld computer is received on said computer attachment portion in said operative position thereof.

31. A system according to claim 30, wherein said keyboard comprises a plurality of switches each electrically coupled to said keyboard processor and a plurality of individual keys each positioned adjacent an associated one of said switches such that manually depressing one of said keys moves the switch associated with the depressed key, each of said switches being adapted such that movement thereof signals said keyboard processor that the key associated therewith has been depressed.

32. A system according to claim 18, wherein said data connector electrically couples to the data port of said handheld computer by an electro-conductive contact connection.

33. A system according to claim 32, wherein said data connector is fixedly positioned on said computer attachment portion such that upon positioning said handheld computer in said operative position said electro-conductive contact connection is established.

34. A system according to claim 33, wherein said data connector and said data port each comprises a plurality of metal prongs for establishing said electro-conductive contact connection.

35. A protective case for a handheld computer comprising: (a) an outer shell configured to be received in a user's hand, (b) a computer processor housed within said outer shell for processing data, (c) a display screen facing outwardly from a front side of said outer shell, said display screen being electrically coupled to said computer processor to enable said processor to display information on said screen, and (d) a data port coupled to said computer processor, said data port being adapted to communicate data between said computer processor and a peripheral device, said protective case comprising:

a computer attachment portion having a data transmitter adapted to transfer data to the computer processor of the handheld computer through the data port of said handheld computer, said computer attachment portion being configured to removably receive said handheld computer thereon in an operative position with said data port of said handheld computer and said data transmitter enabling said data transmitter to transfer data to the computer processor through the data port, a computer cover portion having a keyboard with a plurality of keys having indicia representative of alphabetic and/or numeric characters associated therewith, said keyboard being adapted to transmit a data signal to said computer processor via said data transmitter and the data port to thereby enable the user to input data into said computer processor when said handheld computer is received on said computer attachment portion in said operative position thereof;

said computer cover portion being movably connected to said computer attachment portion to enable said portions to be moved between (a) a computer protecting position wherein, when said handheld computer is in 'said operative position on said computer attachment portion, said cover portion is positioned in an overlying relationship with respect to the front side of the handheld computer and (b) a computer operating position wherein, when said handheld computer is in said operative position on said computer attachment portion, said cover portion is moved out of said overlying relationship to enable said user to view the display screen of said handheld computer and operate said keyboard to input data into said processor, said computer cover portion being sized and configured to cover at least the display screen on the front side of said handheld computer in said computer protecting position thereof to protect the display screen of said computer;

said keyboard being arranged with respect to said computer attachment portion such that upon relative movement of said cover and attachment portions into said computer operating position the indicia on said keyboard has the same general orientation from a user's perspective as characters displayed on the display screen of said handheld computer without requiring reorientation of said handheld computer relative to said keyboard to achieve said orientation.

36. A protective case according to claim 35, wherein said computer attachment portion has a computer retainer that releasably retains said handheld computer in said operative position on said computer attachment portion.

37. A protective case according to claim 36, wherein said computer cover portion is sized and configured to completely cover the front side of said handheld computer in said computer protecting position thereof to protect the front side of said computer.

38. A protective case according to claim 37, wherein said computer attachment portion is pivotally connected to said cover portion.

39. A protective case according to claim 38, wherein said computer attachment portion is sized and configured to completely cover a rear side of said handheld computer in said operative position thereof.

40. A protective case according to claim 39, wherein said computer attachment portion and said computer cover portion each have an outer shell, said outer shells being configured such that, when said handheld computer is in said operative position thereof and said computer cover portion is in said computer protecting position thereof, said outer shells cooperate to completely enclose said handheld computer.

41. A protective case according to claim 40, wherein the outer shells of said computer attachment portion and said computer cover portion are each formed from a substantially rigid material.

42. A protective case according to claim 41, wherein substantially rigid material is plastic.

43. A protective case according to claim 41, wherein said computer attachment portion and said computer cover portion provide cooperating structures that cooperate with one another to releasably retain said computer cover portion in said computer protecting position thereof.

44. A protective case according to claim 43, wherein said cooperating structures include a latch portion provided on one of said cover and attachment portions and a latch portion provided on the other of said cover and attachment portions, said latch portions being engageable with one another in a releasably interlocked relation to releasably retain said computer cover portion in said computer protecting position thereof, said latch portion being disengageable to release said computer cover portion for movement from said computer protecting position thereof.

45. A protective case according to claim 44, wherein one of said latch portions is a latch hook and wherein the other of said latch portions is a hook receiving member with a hook receiving opening, said hook being receivable in said hook receiving opening to provide said interlocked relation and releasably retain said computer cover portion in said computer protecting position thereof, said hook being removable from said hook receiving opening to release said computer cover portion for movement from said computer protecting position thereof.

46. A protective case according to claim 40, wherein said computer cover portion and said computer attachment portion are each made from a flexible material.

47. A protective case according to claim 35, further comprising:

a keyboard processor electrically coupled to said keyboard and said keyboard processor being adapted to process the keystrokes applied to said keyboard by the user and transmit said data signal based on said keystrokes to said computer processor via the electrical coupling of said data connector and said data port to thereby enable the user to input data into said computer processor when said handheld computer is received on said computer attachment portion in said operative position thereof.

48. A protective case according to claim 47, wherein said keyboard comprises a plurality of switches each electrically coupled to said keyboard processor and a plurality of individual keys each positioned adjacent an associated one of said switches such that manually depressing one of said keys moves the switch associated with the depressed key, each of said switches being adapted such that movement thereof signals said keyboard processor that the key associated therewith has been depressed.

49. A protective case according to claim 35, wherein said keyboard is the only input device on said computer cover portion.

50. A protective case according to claim 35, wherein said data transmitter electrically couples to the data port of said handheld computer by an electro-conductive contact connection.

51. A protective case according to claim 50, wherein said data transmitter is fixedly positioned on said computer attachment portion such that upon positioning said handheld computer in said operative position said electro-conductive contact connection is established.

52. A protective case according to claim 51, wherein said data transmitter comprises a plurality of metal prongs for establishing said electro-conductive contact connection.

53. A handheld computer system comprising:
(A) a handheld computer comprising:
an outer shell configured to be received in a user's hand,
a computer processor housed within said outer shell for processing data,
a display screen facing outwardly from a front side of said outer shell, said display screen being electrically coupled to said processor to enable said processor to display information on said screen, and
a data port electrically coupled to said computer processor, said data port being adapted to communicate data between said computer processor and a peripheral device,
(B) a protective case comprising:
a computer attachment portion having a data transmitter adapted to transfer data to the computer processor of the handheld computer through the data port of said handheld computer, said computer attachment portion having said handheld computer removably received thereon in an operative position with said data port of said handheld computer and said data transmitter enabling said data transmitter to transfer data to the computer processor through the data port; and
a computer cover portion having a keyboard with a plurality of keys having indicia representative of alphabetic and/or numeric characters associated therewith, said keyboard being adapted to transmit a data signal to said computer processor via said data transmitter and the data port to thereby enable the user to input data into said computer processor;
said computer cover portion being movably connected to said computer attachment portion to enable said portions to be moved between (a) a computer protecting position wherein said cover portion is positioned in an overlying relationship with respect to the front side of the handheld computer and (b) a computer operating position wherein said cover portion is moved out of said overlying relationship to enable said user to view the display screen of said handheld computer and operate said keyboard to input data into said processor, said computer cover portion being sized and configured to cover at least the display screen on the front side of said handheld computer in said computer protecting position thereof to protect the display screen of said computer;
said keyboard being arranged with respect to said computer attachment portion such that upon relative movement of said cover and attachment portions into said computer operating position the indicia on said keyboard has the same general orientation from a user's perspective as characters displayed on the display screen of said handheld computer without requiring reorientation of said handheld computer relative to said keyboard to achieve said orientation.

54. A system according to claim 53, wherein said computer attachment portion has a computer retainer releasably retaining said handheld computer in said operative position on said computer attachment portion.

55. A system according to claim 54, wherein said computer cover portion is sized and configured to completely cover the front side of said handheld computer in said computer protecting position thereof to protect the front side of said computer.

56. A system according to claim 55, wherein said computer attachment portion is pivotally connected to said cover portion.

57. A system according to claim 56, wherein said computer attachment portion is sized and configured to completely covers a rear side of said handheld computer in said operative position thereof.

58. A system according to claim 57, wherein said computer attachment portion and said computer cover portion each have an outer shell, said outer shells being configured such that, when said computer cover portion is in said computer protecting position thereof, the outer shells of said cover portion and said attachment portion cooperate to completely enclose said handheld computer.

59. A system according to claim 58, wherein the outer shells of said computer attachment portion and said computer cover portion are each formed from a substantially rigid material.

60. A system according to claim 59, wherein substantially rigid material is plastic.

61. A system according to claim 59, wherein said computer attachment portion and said computer cover portion provide cooperating structures that cooperate with one another to releasably retain said computer cover portion in said computer protecting position thereof.

62. A system according to claim 61, wherein said cooperating structures include a latch portion provided on one of said cover and attachment portions and a latch portion provided on the other of said cover and attachment portions, said latch portions being engageable with one another in a releasably interlocked relation to releasably retain said computer cover portion in said computer protecting position thereof, said latch portion being disengageable to release said computer cover portion for movement from said computer protecting position thereof.

63. A system according to claim 62, wherein one of said latch portions is a latch hook and wherein the other of said latch portions is a hook receiving member with a hook receiving opening, said hook being receivable in said hook receiving opening to provide said interlocked relation and releasably retain said computer cover portion in said computer protecting position thereof, said hook being removable from said hook receiving opening to release said computer cover portion for movement from said computer protecting position thereof.

64. A system according to claim 58, wherein the outer shells of said computer cover portion and said computer attachment portion are each made from a flexible material.

65. A system according to claim 53, further comprising:
a keyboard processor electrically coupled to said keyboard and said keyboard processor being adapted to process the keystrokes applied to said keyboard by the user and transmit said data signal based on said keystrokes to said computer processor via the electrical coupling of said data connector and said data port to thereby enable the user to input data into said computer processor when said handheld computer is received on said computer attachment portion in said operative position thereof.

66. A system according to claim 65, wherein said keyboard comprises a plurality of switches each electrically coupled to said keyboard processor and a plurality of individual keys each positioned adjacent an associated one of said switches such that manually depressing one of said keys moves the switch associated with the depressed key, each of said switches being adapted such that movement thereof signals said keyboard processor that the key associated therewith has been depressed.

67. A system according to claim 53, wherein said keyboard is the only input device on said computer cover portion.

68. A system according to claim 53, wherein said data transmitter electrically couples to the data port of said handheld computer by an electro-conductive contact connection.

69. A system according to claim 68, wherein said data transmitter is fixedly positioned on said computer attachment portion such that upon positioning said handheld computer in said operative position said electro-conductive contact connection is established.

70. A protective case according to claim 69, wherein said data transmitter and said data port each comprise a plurality of metal prongs for establishing said electro-conductive contact connection.

* * * * *